United States Patent [19]

Doppstadt

[11] Patent Number: 4,852,816
[45] Date of Patent: Aug. 1, 1989

[54] COMPOSTING EQUIPMENT

[76] Inventor: Werner Doppstadt, Vossnacker Strasse 67, 5620 Velbert-Langenberg, Fed. Rep. of Germany

[21] Appl. No.: 135,587

[22] Filed: Dec. 21, 1987

[30] Foreign Application Priority Data

Dec. 23, 1986 [DE] Fed. Rep. of Germany ....... 3644210

[51] Int. Cl.⁴ .................. B02C 13/286; B02C 13/30
[52] U.S. Cl. .................... 241/101.7; 241/186.4; 241/189 R
[58] Field of Search ............ 241/101.7, 189 R, 186 R, 241/101.2, 186.4

[56] References Cited

U.S. PATENT DOCUMENTS 3,436,028  4/1969  Koehnen et al. ................ 241/186.4
3,850,364 11/1974  Robbins ...................... 241/186.4 X
4,030,865  6/1977  Kobayashi ..................... 425/82

FOREIGN PATENT DOCUMENTS 3517684 11/1986 Fed. Rep. of Germany .

Primary Examiner—Mark Rosenbaum
Attorney, Agent, or Firm—Lee & Smith

[57] ABSTRACT

A composting equipment for crushing wood comprises a container, a conveying device and an impact mechanism at its one end. At its other end a driving engine is located which is coupled to the impact mechanism by a power transmission. The conveying device is located at the same level as the shaft of the impact mechanism. A barrel compresses the material and pulls the material in. Wheels and supports permit quasi-stationary installation at the site of operation and a slight displacement for example by means of a shovel dozer.

9 Claims, 3 Drawing Sheets

COMPOSTING EQUIPMENT

TECHNICAL FIELD

The invention refers to composting equipment for crushing organic waste, particularly wood, comprising (a) an elongated trough-shaped container having a bottom, opposite side walls, a first end and a second end, (b) a conveyer device which extends along said conveyer, said conveyer device being arranged to convey material placed thereon in a conveying direction longitudinally of said elongated trough towards said one or first end (c) an impact mechanism arranged at said one or first end of the container to receive material from said conveyer device on an inlet side, to crush such material and, on an outlet side, to expel such crushed material from said container at said one or first end.

BACKGROUND ART

Large quantities of organic waste develops in forestry, at municipal corporations or road building and maintenance authorities, for example waste wood when road trees are trimmed, wastes from cemeteries or also waste woods from the disposal of bulky goods or the household rubbish. It is desirable not to burn such waste wood or to feed it to a garbage incineration facility but to compost it for generating natural humus. The environment is heavily burdened by burning or by a garbage incineration facility. Besides burning in a garbage incineration facility involves considerable costs. Therefore is is known to comminute waste wood and to pit it such that it changes into humus by natural decomposition. To accelerate the rotting, rotting-stimulating agents, for example lime nitrogen are added to the comminuted organic wastes.

A composting equipment for crushing wood and other organic waste is illustrated and described in German patent document No. 3,517,684. In the embodiment illustrated and described there, the composting equipment is arranged on the loading area of a motor truck and is driven by the internal combustion engine of the truck through a mechanical or hydraulic power connection which is normally present in a motor truck. From German patent document 3,517,684 it is also known to remove the composting equipment from the motor truck by means of a conventional quick change attachment. Then the motor truck is also available for other purposes. In this case however the composting equipment cannot be used, because the drive by the motor truck is disconnected.

The known arrangement is non-uniformly loaded because of a heavy load, namely the heavy impact mechanism, at the rear end.

DISCLOSURE OF INVENTION

It is the object of the invention to provide composting equipment of the type mentioned above which can be handled easier, because the non-uniformly loading is eliminated and which enables operation independent of the internal combustion engine of a motor truck.

According to the invention this object is achieved in that (d) a driving engine is attached to the container at its other or second end, remote from the impact mechanism, and (e) the driving engine is coupled to the impact mechanism by power transmission means which extend along the trough-shaped container.

The driving engine makes the composting equipment independent of an external drive. Therefore the composting equipment can also be used as a quasistationary machine after being removed from the motor truck. In addition the heavy driving engine constitutes a counterweight arranged at the end remote from the impact mechanism. Therefore the composting equipment can be handled easier than the prior art composting equipment in spite of its higher weight.

BRIEF DESCRIPTION OF THE DRAWINGS

An embodiment of the invention will now be described in further detail with reference to the accompanying drawings.

BEST MODE OF CARRYING OUT THE INVENTION

Figure 1:
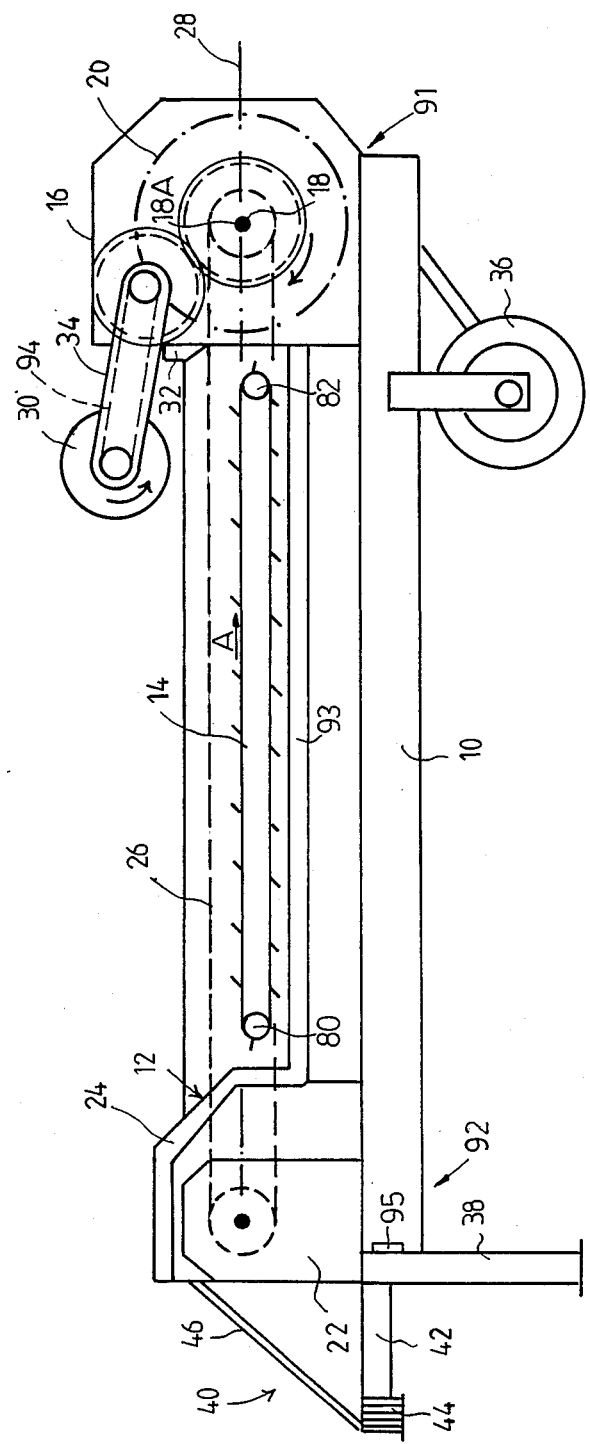
FIG. 1 shows a side elevation of the composting equipment.

A trough-shaped container 12 having opposing sidewalls 12A is located on a chassis 10. A conveying device 14 extends along the a bottom a3 of the container 12 between sidewalls 12A. The conveying device 14 is arranged to convey material to the right or first end a1 of the container 12 in direction A shown by the arrow, as viewed in the Figure. An impact mechanism 16 is arranged at this end a1. The impact mechanism 16 closes the container 12. The impact mechanism 16 is of similar construction as that disclosed in German patent document No. 3,517,684 and therefore is not illustrated and described in further detail here. The impact mechanism 16 comprises flails which rotate about axis of rotation 18A of a shaft 18 within the cylindric area 20 indicated by the dashed-and-dotted line. Material, for example branches, boards, stems etc. which is thrown into the container 12, is transported to the impact mechanism 16 by the conveying device 14 and is treated there by the flails until the pieces of wood or elements of wood are crushed to small pieces. This is described in detail in German patent document No. 3,517,684.

A driving engine 22 is attached to the container 12 at its end second a1 remote from the impact mechanism 16. The driving engine 22 is located on the chassis 10 and is covered by a shield 24 which is integral with the second end a2 of the container 12. The driving engine 22 is coupled to the impact mechanism 16 by a power transmission 26 which extends along the trough-shaped container 12.

In German patent document No. 3,517,684 a heavy chain curtain is arranged in front of the impact mechanism 16. This chain curtain is intended to prevent material from being catapulted back to the rear by the impact mechanism. In the prior art composting equipment a conveying device is arranged below the shaft of the impact mechanism. Thereby the flails hit the material in the direction from "right below" in FIG. 2 of German patent document No. 3,517,684 and catapult the material to the direction "right top", that means opposite to the conveying direction of the conveying device back into the container.

In the present embodiment however, the conveying device 14 is arranged in or above a plane 28 extending through the shaft 18. Thereby the material is at the most hit vertically from below such that it is catapulted vertically to the top against a rebounding wall arranged there.

Instead of the chain curtain a heavy barrel 30 extending transversely above the conveying device 14 is arranged at the inlet side of the impact mechanism. This barrel 30 is supported by a stop 32 and is movably guided by an arm 34 for upward movement. The barrel 30 is driven by a driving means a4 in the sense of pulling the material which is to be crushed into the impact mechanism 16. In the Figure the barrel 30 is driven counterclockwise around axis of rotation 18A of the shaft 18 as illustrated. By this barrel 30 the material is compressed for processing by the impact mechanism 16.

The trough-shaped container 12 is supported by a pair of wheels 36 at the first end a1 adjacent the impact mechanism. A pair of supports 38 can be releasably attached to the trough-shaped container 12 at the second end a2 adjacent the driving engine 22. Furthermore the trough-shaped container 12 is designed such that coupling means 40 for a tractor can be attached at the second end a2 adjacent the driving engine 22. These coupling means 40 comprise a drawbar 42 attached to the chassis 10 in the middle of the left end face thereof. This drawbar has a coupler socket 44 at its end. The coupler socket is connected to two struts 46 which are arranged to form a "V". The struts 46 are connected with their free ends to the shield 24 provided for the driving engine 22. Thus the coupler socket 44 is connected to three points of the structure by the drawbar 42 and the strut 46.

When the composting equipment is slightly displaced at its site of operation, this can be done by the shovel dozer, which is normally present for charging the container 12, by engaging the coupler socket 44. After removing the supports 38 at the releasable attachment means a5, if necessary, the whole composting eqipment can be lifted and can be pulled forwards on the wheels 36. The coupler socket 44 can also be used for coupling the composting equipment to a tractor. It is, however, also possible to pull the composting equipment onto the loading area of a suitable motor truck.

Figure 2:
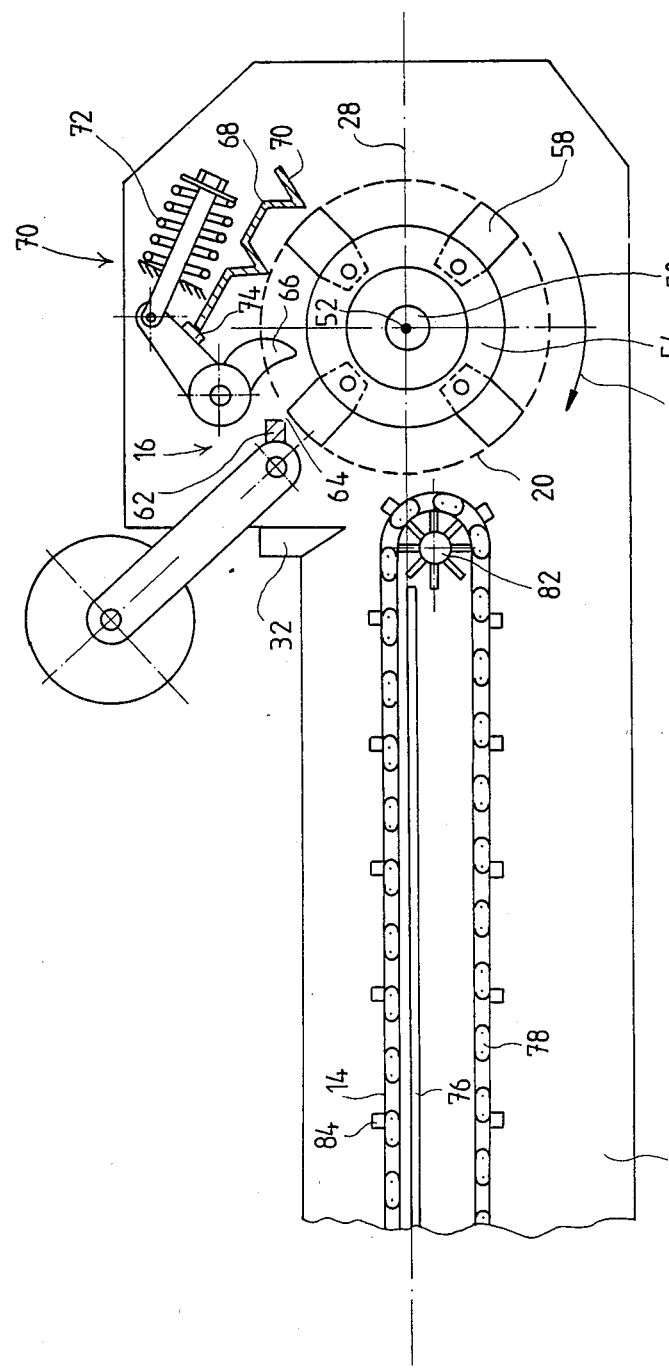
FIG. 2 shows details of the conveyer device and of the impact mechanism.
Figure 3:
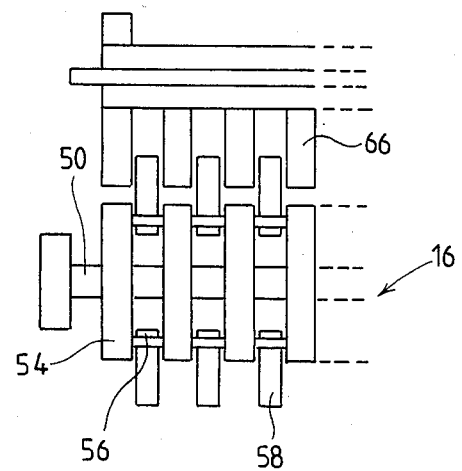
FIG. 3 is an end view of the impact mechanism.

As can be seen from FIGS. 2 and 3, the impact mechanism 16 comprises a shaft 50 having an axis of rotation 52. A plurality of spaced discs 54 are attached to shaft 50. Off-axis axles 56 extend between these discs 54. Flails 58 are rotatably mounted on the axles 56. These flails 58 are pulled outwards by centrifugal force, when the shaft 50 rotates. The range of action of the flails 58 is limited by the notional cylinder surface 20. The direction of rotation of the impact mechanism 16 as illustrated by arrow 60 is such, that the flails, on the side of the conveyer 14, i.e. on the left in FIG. 2, are moved upwards. An impact surface 62 is provided above the said notional cylinder surface 20. The impact surface 62 and the notional cylinder surface 20 define a narrow exit slit 64.

The waste to be crushed is conveyed in direction A by the conveyer device 14 into the range of action of the impact mechanism 16. There the material is chopped and crushed by the flails 58 and thrown against the impact surface 62. Then it falls down again from the impact surface 62. The conveyer device 14 takes care of always returning the rebounding material to the range of action of the flails 62. In this range the material is exposed to the action of the flails 62, until it has been reduced to a size permitting passage through the exit slit 64.

Nevertheless material pieces may get into the space behind the exit slit 64 during the rotation of the impact mechanism 16, without having been crushed sufficiently. In order to ensure the chopping and crushing also of those parts, a row of retainer claws 66 is provided on the outlet side of the outlet slit 64. These retainer claws 66 extend into the interstices between the rotating flails 58, as can be seen from FIG. 3. The material pieces which have bypassed the exit slit 64, will be retained by the retainer claws 66 and will be further chopped and crushed by the flails 58 passing between the retainer claws 66. A further impact surface 68 is provided on the exit side of the retainer claws 66. This impact surface 68 extends at an angle to the bottom towards the outlet side. This further impact surface 68 has transverse projections 70, which re-direct the material thrown against the impact surface 68 back into the range of action of the impact mechanism 16. Thus also the material, which has got in front of the retainer claws 66 and is cut there, will be returned once or twice into the range of action of the impact mechanism 16, whereby complete comminution is achieved.

If parts such as pieces of iron or concrete are fed to the impact mechanism 16 and cannot be chopped and crushed by the impact mechanism, provisions have to be made to avoid damage of the impact mechanism.

For this reason, the flails 58 are pivotable to an extent that they can be pivoted into the area within the circumference of the discs 54. Thus if the flails 58 are unable to chop a material part, the flails 58 can yield and pass this part within the discs 54. If such part then gets in front of the retainer claws 66, damage of the retainer claws 66 is prevented by a structure 70 which permits also the retainer claws 66 to yield, if they are subjected to excessive force. This structure comprises a biased spring 72, which urges the retainer claws 66 against a stop 74.

As can be seen from FIGS. 1 and 2, the conveyer device 14 comprises a plate 76 extending along the sidewalls 12A the container 12, and a pair of endless conveyer chains 78 passed over two sprocket wheels 80 and 82. The conveyer chains 78 extend along the two longitudinal edges of the plate 76. The forward paths of the conveyer chains 78 extend above the plate 76. The conveyer 14 comprises also transverse ledges 84 the ends of which are connected with the conveyer chains 78. When the conveyer chains 78 are driven, the ledges 84 move over the plate 76 and thereby take along all material placed on the plate 76 and feed it to the impact mechanism 16.

As can be seen also from FIG. 2, the plate 76 of the conveyer device 14 is arranged in, but may also be arranged above the horizontal plane 28 through the axis of rotation 18A.

I claim:

1. A composting equipment for crushing organic waste, comprising:
   an elongated trough-shaped container having a bottom, opposite side walls and a first and a second end, a conveyer device which extends along said elongated trough-shaped container between said first and second ends of said elongated trough-shaped container;
   said conveyer device serving for conveying material placed thereupon in a conveying direction longitudinally of said elongated trough-shaped container toward said first end of said elongated trough-shaped container, an impact mechanism arranged at said first end of the elongated trough-shaped container and having an inlet side and an outlet side, said impact mechanism receiving, on its inlet side, said material conveyed by said conveyer device toward said first end of said elongated trough-shaped container for crushing said material, said impact mechanism expelling, on it output side, the received material in a crushed condition, said impact mechanism comprising a horizontal shaft driven to rotate about an axis of rotation and carrying flails arranged to hit the material to be crushed during such rotation, the direction of rotation of the impact mechanism being such that the flails, on the side of the conveyer device, are moved upwards, said conveyer device being arranged in or above a horizontal plane extending through said axis of rotation of said horizontal shaft, a driving engine attached to said elongated trough-shaped container at said second end of said elongated trough-shaped container and opposite to said impact mechanism as viewed in said conveying direction of said conveyer device, power transmission means for coupling said driving engine with said impact mechanism and driving said horizontal shaft to rotate about said axis of rotation, and said power transmission means extending along said elongated trough-shaped container.

2. A composting equipment for crushing organic waste, comprising:

an elongated trough-shaped container having a bottom, opposite side walls and a first and a second end, a conveyer device which extends along said elongated trough-shaped container between said first and second ends of said elongated trough-shaped container, said conveyer device serving for conveying material placed thereupon in a conveying direction longitudinally of said elongated trough-shaped container towards said first end of said elongated trough-shaped container, an impact mechanism arranged at said first end of the elongated trough-shaped container and having an inlet side and an outlet side, said impact mechanism receiving, on its inlet side, said material conveyed by said conveyer device toward said first end of said elongated trough-shaped container for crushing said material, said impact mechanism expelling, on its output side, the received material in a crushed condition, a driving engine attached to said elongated trough-shaped container at said second end of said elongated trough-shaped container and opposite to said impact mechanism as viewed in said conveying direction of said conveyer device, and power transmission means for coupling said driving engine with said impact mechanism and extending along said elongated trough-shaped container, wherein said impact mechanism comprises a horizontal shaft, driven to rotate about an axis of rotation and carrying flails arranged to hit the material to be crushed during such rotation, the direction of rotation of the impact mechanism being such that the flails, on the side of the conveyer device, are moved upwards, and wherein said conveyer device is arranged in or above a horizontal plane extending through said axis of rotation of said shaft.

3. Composting equipment as claimed in claim 2, and further comprising a heavy barrel which is arranged on the inlet side of said impact mechanism above said conveyer device and extends transversely to said conveying direction, stop means for limiting downward movement of said barrel, and guiding means for guiding said barrel for movement upward from said stop means.

4. The composting equipment as claimed in claim 3, and further comprising means for driving said barrel in a sense to pull material from said conveyer device into said impact mechanism.

5. Composting equipment as claimed in claim 4, wherein said guiding means comprise a pair of pivotably mounted arms extending on opposite sides of said barrel and carrying said barrel therebetween.

6. The composting equipment as claimed in claim 2, and further comprising, a pair of wheels provided on said elongated trough-shaped container and supporting said first end of said elongated trough-shaped container, a pair of supports for supporting said second end of said elongated trough-shaped container, means for releasably attaching said pair of supports to said second end of said elongated trough-shaped container, and coupling means provided at said second end of said elongated trough-shaped container for coupling said elongated trough-shaped container to a traction device.

7. The composting equipment for crushing organic waste, comprising:

an elongated trough-shaped container having a bottom, opposite side walls and a first and a second end, a conveyer device which extends along said bottom, said conveyer device being arranged to convey material placed thereon in a conveying direction longitudinally of said trough-shaped container towards said first end of said elongated trough-shaped container, an impact mechanism arranged at said first end of the elongated trough-shaped container to receive material from said conveyer device on an inlet side, to crush such material and, on an outlet side, to expel such crushed material at said first end of said elongated trough-shaped container, a heavy barrel which is arranged on the inlet side of said impact mechanism above said conveyer device and extends transversely to said conveying direction, stop means for limiting downward movement of said barrel, and guiding means for guiding said barrel for movement upward from said stop means, means for driving said barrel in a sense to pull material from said conveyer device into said impact mechanism, said impact mechanism comprising a horizontal shaft, driven to rotate about an axis of rotation and carrying flails arranged to hit the material to be crushed during such rotation, the direction of rotation of the impact mechanism being such that the flails, on the side of the conveyer device, are moved upwards, said conveyer device being arranged in or above a horizontal plane extending through said axis of rotation of said shaft, a driving engine attached to said second end of said elongated trough-shaped container, and power transmission means for coupling said driving engine with said impact mechanism and extending along said elongated trough-shaped container.

8. Composting equipment as claimed in claim 7, wherein said guiding means comprise a pair of pivotably mounted arms extending on opposite sides of said barrel and carrying said barrel therebetween.

9. The composting equipment as claimed in claim 7, and further comprising, a pair of wheels provided on said elongated trough-shaped container and supporting said first end of said elongated trough-shaped container, a pair of supports for supporting said second end of said elongated trough-shaped container, means for releasably attaching said pair of supports to said second end of said elongated trough-shaped container, and coupling means provided at said second end of said elongated trough-shaped container for coupling said elongated trough-shaped container to a traction device.

* * * * *